(12) United States Patent
Suzuki

(10) Patent No.: US 10,095,174 B2
(45) Date of Patent: Oct. 9, 2018

(54) HIGH-VOLTAGE POWER SUPPLY AND IMAGE FORMING APPARATUS

(71) Applicant: Oki Data Corporation, Minato-ku, Tokyo (JP)

(72) Inventor: Shuichi Suzuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/492,138

(22) Filed: Apr. 20, 2017

(65) Prior Publication Data

US 2017/0315495 A1 Nov. 2, 2017

(30) Foreign Application Priority Data

Apr. 27, 2016 (JP) .................. 2016-088800

(51) Int. Cl.
*G03G 15/00* (2006.01)
*H02M 3/335* (2006.01)

(52) U.S. Cl.
CPC ........ *G03G 15/80* (2013.01); *H02M 3/33546* (2013.01)

(58) Field of Classification Search
CPC ............................ G03G 15/80; H02M 3/33546
See application file for complete search history.

(56) References Cited

U.S. PATENT DOCUMENTS

| 4,389,702 A * | 6/1983 | Clemente | H02M 3/33546 363/142 |
| 4,868,729 A * | 9/1989 | Suzuki | G03G 15/80 363/21.15 |
| 5,864,733 A * | 1/1999 | Mae | G03G 15/0907 399/46 |
| 6,205,037 B1 * | 3/2001 | Fitzgerald, Jr. | H02M 3/33546 363/131 |
| 6,373,232 B1 * | 4/2002 | Mano | G03G 15/2003 219/216 |
| 7,058,333 B2 * | 6/2006 | Shin | G03G 15/01 399/88 |
| 2004/0042813 A1 * | 3/2004 | Takai | G03G 15/5004 399/88 |

(Continued)

FOREIGN PATENT DOCUMENTS

JP 2011248088 A 12/2011

*Primary Examiner* — David Bolduc
(74) *Attorney, Agent, or Firm* — Panitch Schwarze Belisario & Nadel LLP

(57) ABSTRACT

A high-voltage power supply includes: a first high-voltage output circuit having a first output connected to a first load, and a second output, and capable of outputting a first voltage having a first polarity to the first load; a voltage clamping element connected to the second output and configured to clamp a voltage at the second output to a second voltage having a second polarity opposite to the first polarity; a second high-voltage output circuit having a third output connected to the second output and a fourth output, and capable of outputting a third voltage having the first polarity; and an output circuit connected to the fourth output and a second load, and configured to produce a voltage having the first polarity and a voltage having the second polarity using the third voltage and a voltage derived from the second voltage and output the produced voltages to the second load.

13 Claims, 5 Drawing Sheets

(56) References Cited

U.S. PATENT DOCUMENTS

| | | | |
|---|---|---|---|
| 2011/0150523 A1* | 6/2011 | Kawakatsu | G03G 15/80 399/88 |
| 2011/0158675 A1* | 6/2011 | Inukai | G03G 15/5004 399/88 |
| 2013/0045023 A1* | 2/2013 | Kosaka | G03G 15/80 399/88 |
| 2013/0164017 A1* | 6/2013 | Komai | G03G 15/80 399/88 |
| 2013/0259543 A1* | 10/2013 | Katagiri | G03G 15/5004 399/302 |
| 2014/0293659 A1* | 10/2014 | Kosaka | H02M 3/33546 363/21.09 |
| 2015/0055972 A1* | 2/2015 | Kosaka | G03G 15/80 399/88 |
| 2015/0071663 A1* | 3/2015 | Yoshioka | G03G 15/065 399/50 |
| 2015/0268617 A1* | 9/2015 | Kasamatsu | G03G 15/80 399/55 |
| 2015/0311805 A1* | 10/2015 | Yamashita | H02M 3/33507 363/21.01 |
| 2016/0116883 A1* | 4/2016 | Tatsuzue | G03G 15/80 399/88 |
| 2017/0163163 A1* | 6/2017 | Jang | H02M 3/33546 |
| 2017/0248893 A1* | 8/2017 | Furukawa | G03G 15/1615 |

* cited by examiner

HIGH-VOLTAGE POWER SUPPLY AND IMAGE FORMING APPARATUS

BACKGROUND OF THE INVENTION

1. Field of the Invention

The present invention relates to a high-voltage power supply for outputting a positive voltage and a negative voltage, and an image forming apparatus including the high-voltage power supply.

2. Description of the Related Art

Japanese Patent Application Publication No. 2011-248088 discloses a high-voltage power supply using a transformer.

An apparatus including separately a high-voltage power supply for outputting a positive voltage and a high-voltage power supply for outputting a negative voltage is very large and costly.

SUMMARY OF THE INVENTION

An aspect of the present invention is intended to provide a simple high-voltage power supply capable of outputting a positive voltage and a negative voltage.

According to an aspect of the present invention, there is provided a high-voltage power supply for a first load and a second load, the first load being connected between a first node and a second node, the second load being connected between the first node and a third node. The high-voltage power supply includes: a first high-voltage output circuit having a first output connected to the second node, and a second output, the first high-voltage output circuit being capable of outputting a first voltage having a first polarity to the first load; a voltage clamping element connected between the second output and the first node, the voltage clamping element being configured to clamp a voltage at the second output to a second voltage having a second polarity opposite to the first polarity, the first high-voltage output circuit being connected between the voltage clamping element and the second node; a second high-voltage output circuit having a third output connected to the second output, and a fourth output, the second high-voltage output circuit being capable of outputting a third voltage having the first polarity; and an output circuit connected to the fourth output and having a fifth output connected to the third node, the output circuit being configured to produce a voltage having the first polarity and a voltage having the second polarity using the third voltage and a voltage derived from the second voltage and output the produced voltages to the second load.

DETAILED DESCRIPTION OF THE INVENTION

Figure 1:
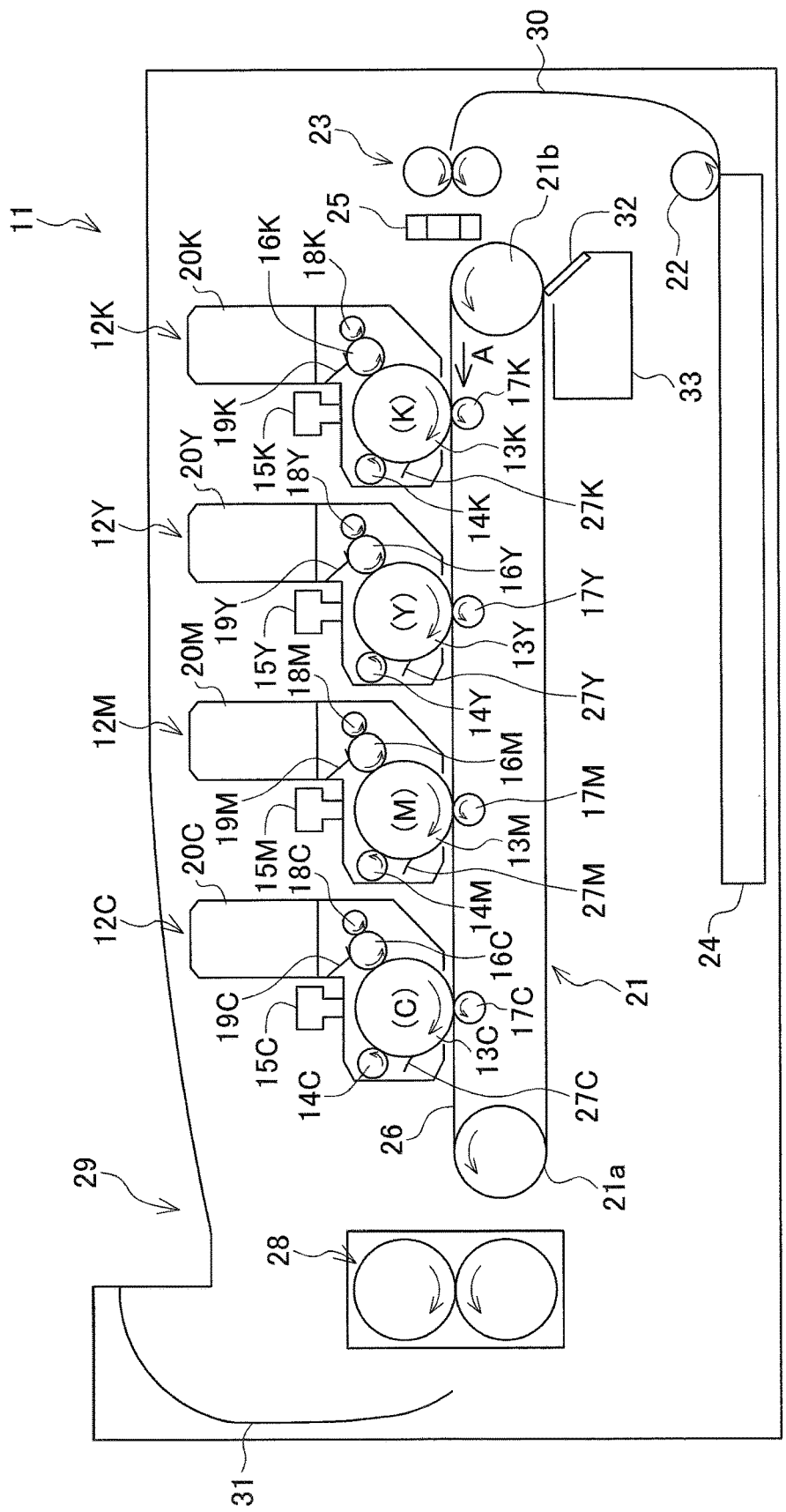
FIG. 1 is a configuration diagram schematically illustrating a configuration of an image forming apparatus including a high-voltage power supply according to an embodiment of the present invention.

FIG. 1 is a configuration diagram schematically illustrating a configuration of an image forming apparatus 11 including a high-voltage power supply according to an embodiment of the present invention.

The image forming apparatus 11 is, for example, an electrophotographic color printer. The image forming apparatus 11 includes four independent image forming units 12K, 12Y, 12M, and 12C that constitute an image forming section. The image forming units 12K, 12Y, 12M, and 12C are arranged in order along a direction (indicated by arrow A in FIG. 1) in which a recording sheet (or recording paper sheet) 30 as a recording medium is conveyed. The image forming unit 12K forms a black (K) image; the image forming unit 12Y forms a yellow (Y) image; the image forming unit 12M forms a magenta (M) image; the image forming unit 12C forms a cyan (C) image. When the image forming units 12K, 12Y, 12M, and 12C need not be distinguished from each other, they may be referred to simply as the image forming units 12. As the recording medium, an overhead projector (OHP) sheet, an envelope, a copy paper sheet, a special paper sheet, or other media may be used.

The image forming units 12K, 12Y, 12M, and 12C respectively include: photosensitive drums 13K, 13Y, 13M, and 13C as image carriers; charging rollers 14K, 14Y, 14M, and 14C that uniformly charge surfaces of the photosensitive drums 13K, 13Y, 13M, and 13C; developing rollers 16K, 16Y, 16M, and 16C that cause developer (e.g., toner) to adhere to electrostatic latent images formed on the surfaces of the photosensitive drums 13K, 13Y, 13M, and 13C to form toner images, which are visible images, of the respective colors; toner supplying rollers 18K, 18Y, 18M, and 18C pressed against the developing rollers 16K, 161, 16M, and 16C; and cleaning blades 27K, 27Y, 27M, and 270 that remove toner remaining on the photosensitive drums 13K, 131,'13M, and 13C after transfer. When the photosensitive drums 13K, 131, 13M, and 13C need not be distinguished from each other, they may be referred to simply as the photosensitive drums 13. When the charging rollers 14K, 141, 14M, and 14C need not be distinguished from each other, they may be referred to simply as the charging rollers 14. When the developing rollers 16K, 161, 16M, and 16C need not be distinguished from each other, they may be referred to simply as the developing rollers 16. When the toner supplying rollers 18K, 181, 18M, and 18C need not be distinguished from each other, they may be referred to simply as the toner supplying rollers 18. When the cleaning blades 27K, 271, 27M, and 27C need not be distinguished from each other, they may be referred to simply as the cleaning blades 27.

The toner supplying rollers 18K, 181, 18M, and 18C supply the developing rollers 16K, 161, 16M, and 16C with black, yellow, magenta, and cyan toners supplied from toner cartridges 20K, 201, 20M, and 20C, which are detachably attached to main bodies of the image forming units 12K, 12Y, 12M, and 12C, respectively. When the toner cartridges 20K, 201, 20M, and 200 need not be distinguished from each other, they may be referred to simply as the toner cartridges 20. Developing blades 19K, 19Y, 19M, and 19C are pressed against the developing rollers 16K, 16I, 16M, and 16C, respectively. When the developing blades 19K, 19Y, 19M, and 19C need not be distinguished from each other, they may be referred to simply as the developing blades 19. The developing blades 19 form thin layers of the toners, which are supplied from the toner supplying rollers 18, on the developing rollers 16. In this embodiment, the toner cartridges 20 are detachably attached to the main bodies of the image forming units 12, but they may be formed integrally with the main bodies of the image forming units 12.

Light emitting diode (LED) heads 15K, 15Y, 15M, and 15C are disposed above the photosensitive drums 13K, 13Y, 13M, and 13C of the image forming units 12K, 12Y, 12M, and 12C so as to face the photosensitive drums 13K, 13Y, 13M, and 13C, respectively. When the LED heads 15K, 15Y, 15M, and 15C need not be distinguished from each other, they may be referred to simply as the LED heads 15. Each of the LED heads 15 is a device that exposes the photosensitive drum 13 to light according to image data of the corresponding color to form an electrostatic latent image.

A transfer unit 21 is disposed below the photosensitive drums 13 of the four image forming units 12. The transfer unit 21 includes transfer rollers 17K, 17Y, 17M, and 17C, transfer belt 26, a drive roller 21a, and a driven roller 21b. The drive roller 21a and driven roller 21b move the transfer belt 26 in the direction indicated by arrow A in FIG. 1 while stretching the transfer belt 26. When the transfer rollers 17K, 17Y, 17M, and 17C need not be distinguished from each other, they may be referred to simply as the transfer rollers 17. Each of the transfer rollers 17 is pressed against the corresponding photosensitive drum 13 with the transfer belt 26 therebetween to form a nip portion. The transfer rollers 17 charge the recording sheet 30 in the nip portions to a polarity opposite to that of the toner, and sequentially transfer the toner images formed on the photosensitive drums 13 onto the recording sheet 30 in a superposed manner.

A paper feeding mechanism for feeding the recording sheet 30 to the transfer belt 26 is disposed at a lower portion of the image forming apparatus 11. The paper feeding mechanism includes a hopping roller 22, a pair of registration rollers 23, a sheet storage cassette 24, and other components.

Further, a fixing unit 28 is disposed downstream of the transfer belt 26 in a direction in which the recording sheet 30 is discharged by the transfer belt 26. The fixing unit 28 is a device that includes a heat roller and a backup roller, and fixes, to the recording sheet 30, the toner transferred on the recording sheet 30 by heating and pressing the toner. A sheet guide 31, discharging rollers (not illustrated) disposed along the sheet guide 31, a sheet stacker 29, and other components are disposed downstream of the fixing unit 28 in a direction in which the recording sheet 30 is discharged by the fixing unit 28.

A printing operation of the image forming apparatus 11 will be briefly described. First, a recording sheet 30 is fed by the hopping roller 22 from the sheet storage cassette 24 to the pair of registration rollers 23, which correct skew of the recording sheet 30 and then convey the recording sheet 30 to the transfer belt 26. With movement of the transfer belt 26, the recording sheet 30 is conveyed to the image forming units 12K, 12Y, 12M, and 12C. A sheet detection sensor 25 is disposed after the pair of registration rollers 23. The sheet detection sensor 25 detects passage of the recording sheet 30 in a contact or non-contact manner, and outputs a detection signal to a print engine controller 153 (FIG. 2) described later.

Meanwhile, in each of the image forming units 12, the surface of the photosensitive drum 13 is charged by the charging roller 14, and then exposed to light by the LED head 15, so that an electrostatic latent image is formed on the surface. The toner in the thin layer on the developing roller 16 is caused to electrostatically adhere to the portion where the electrostatic latent image is formed, so that a toner image of the corresponding color is formed. The toner images formed on the photosensitive drums 13 are sequentially transferred by the transfer rollers 17 onto the recording sheet 30 in a superposed manner, so that a color toner image is formed on the recording sheet 30. Toner remaining on the photosensitive drums 13 after the transfer is removed by the cleaning blades 27.

The recording sheet 30 with the color toner image formed thereon is conveyed to the fixing unit 28, in which the color toner image, is fixed to the recording sheet 30, so that a color image is formed. The recording sheet 30 with the color image formed thereon is conveyed by the discharging rollers (not illustrated) along the sheet guide 31, and discharged to the sheet stacker 29. Through the above process, the color image is formed on the recording sheet 30. Toner adhering to the transfer belt 26 is removed by a belt cleaning blade 32 and stored into a belt cleaner container 33.

Figure 2:
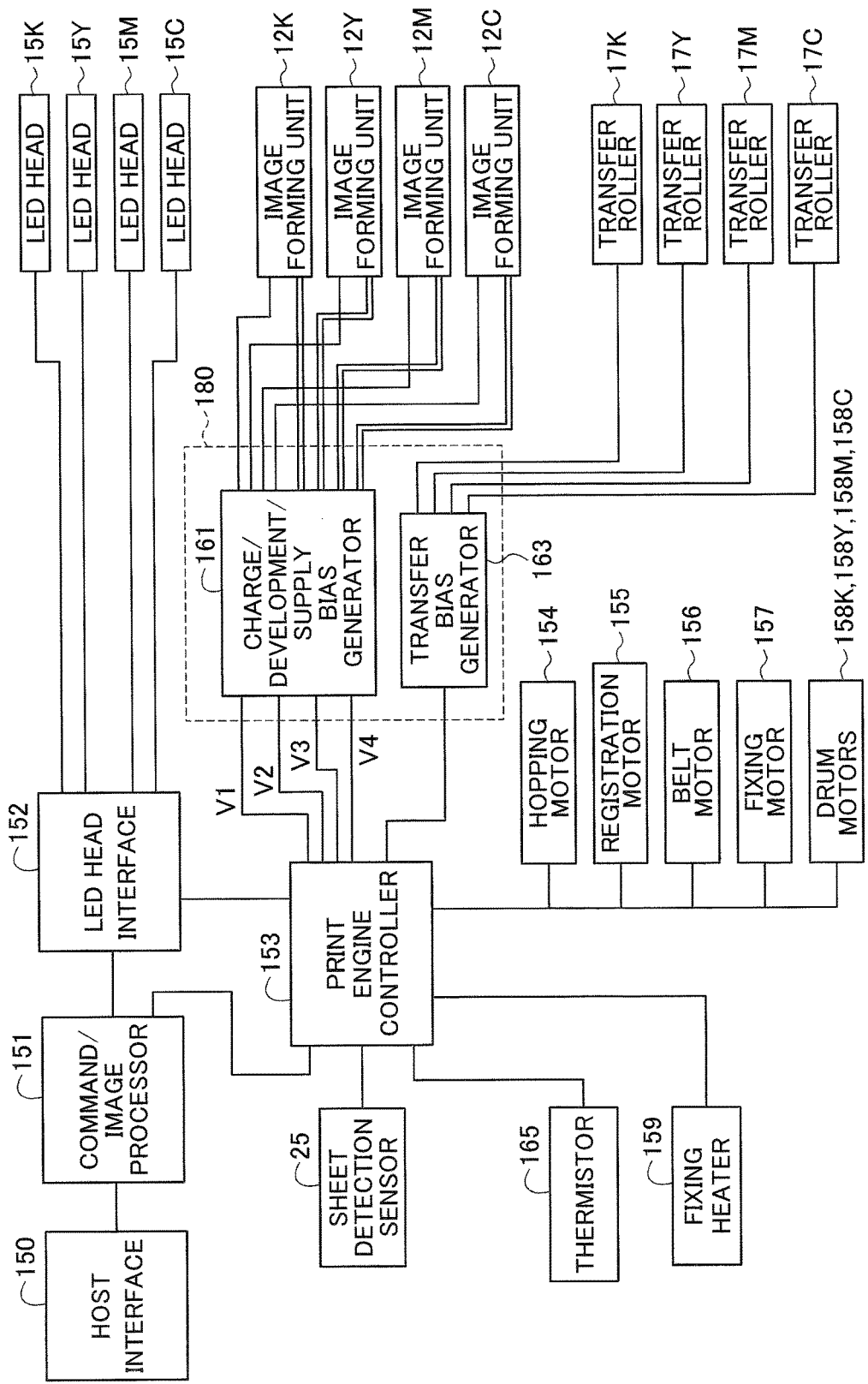
FIG. 2 is a block diagram illustrating a circuit configuration of a control system of the image forming apparatus.

FIG. 2 is a block diagram illustrating a circuit configuration of a control system of the image forming apparatus 11.

The image forming apparatus 11 includes a host interface 150, a command/image processor 151, an LED head interface 152, the print engine controller 153 as a control circuit, and a high-voltage generator 180 as a high-voltage power supply.

The host interface 150 sends and receives data to and from the command/image processor 151. The command/image processor 151 outputs image data to the LED head interface 152. The LED head interface 152 supplies head drive pulses to the LED heads 15K, 15Y, 15M, and 150 to cause them to emit light. The print engine controller 153 controls the head drive pulses and the like.

The print engine controller 153 sends voltage setting signals and control signals to the high-voltage generator 180, which includes a charge/development/supply bias generator 161 and a transfer bias generator 163. The charge/development/supply bias generator 161 individually applies charge bias voltages, development bias voltages, and supply bias voltages to the charging rollers 14, developing rollers 16, and toner supplying rollers 18 (FIG. 1) of the image forming units 12 for black (K), yellow (Y), magenta (M), and cyan (0). The transfer bias generator 163 supplies predetermined transfer bias voltages to the transfer rollers 17 (FIG. 1) for black (K), yellow (Y), magenta (M), and cyan (C). The charge/development/supply bias generator 161 will be described in detail later.

The sheet detection sensor 25 (FIG. 1) is used to adjust timing of generation of bias voltages by the charge/development/supply bias generator 161, as described later. The print engine controller 153 drives, at predetermined times, a hopping motor 154 for driving the hopping roller 22, a registration motor 155 for driving the pair of registration rollers 23, a belt motor 156 for driving the drive roller 21a, a fixing motor 157 for driving the rollers of the fixing unit 28, four drum motors 158K, 158Y, 158M, and 158C for respectively driving the rotating bodies, such as the photosensitive drums 13, of the image forming units 12K, 12Y, 12M, and 12C. The print engine controller 153 controls a fixing heater 159, which is disposed in the heat roller of the fixing unit 28, on the basis of a detection value of a thermistor 165 that detects a temperature of the heat roller.

Figure 3:
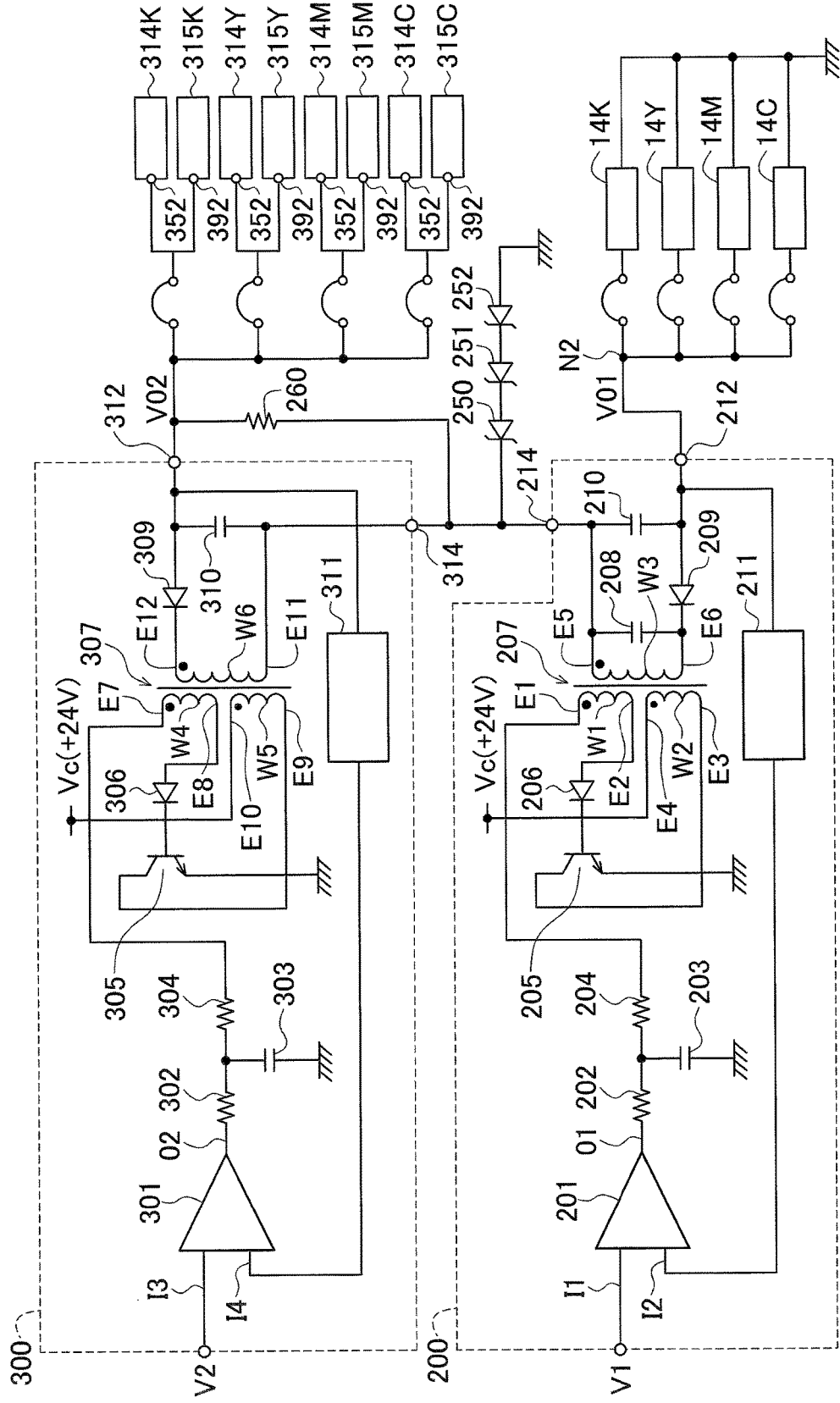
FIG. 3 is a circuit diagram of a charge/development circuit and a negative development circuit in charge/development/supply bias generator.

FIG. 3 is a circuit diagram of a charge/development circuit 200 as a first high-voltage output circuit and negative development circuit 300 as a second high-voltage output circuit in the charge/development/supply bias generator 161.

In FIG. 3, the charge/development circuit 200 includes a feedback control circuit 201. The feedback control circuit 201 has a first input I1 to which a command voltage (or charge output command voltage) V1 is applied from the print engine controller 153 (FIG. 2), a second input I2 to which a feedback voltage is applied from an output voltage conversion circuit 211 described later, and an output O1 connected to a first end E1 of a first primary winding W1 of a high-voltage transformer 207 as a first transformer through resistors 202 and 204. A second end E2 of the first primary winding W1 is connected to the base of an NPN transistor 205 through a diode 206 with its anode connected to the second end E2 and its cathode connected to the base. The junction of the resistors 202 and 204 is grounded through a capacitor 203.

The NPN transistor 205 has its collector connected to a first end E3 of a second primary winding W2 of the high-voltage transformer 207 and its emitter directly grounded. A second end E4 of the second primary winding W2 of the high-voltage transformer 207 is connected directly to a positive direct voltage source Vc (here, +24 V).

A first end E5 of a secondary winding W3 of the high-voltage transformer 207 is connected to an output 214 as a second output of the charge/development circuit 200. The output 214 is connected to ground through Zener diodes 250, 251, and 252 connected in series with their anodes toward ground. A second end E6 of the secondary winding W3 of the high-voltage transformer 207 is connected to the cathode of a diode 209. The anode of the diode 209 is connected to an output 212 as a first output of the charge/development circuit 200, and is connected to the second input I2 of the feedback control circuit 201 through the output voltage conversion circuit 211. The series connection of the Zener diodes 250, 251, and 252 serves as a voltage clamping element (or constant voltage clamping element).

A capacitor 208 is connected between the first end E5 and the second end E6 of the secondary winding W3 of the high-voltage transformer 207. A capacitor 210 is connected between the first end E5 of the secondary winding W3 and the anode of the diode 209. The output 212 is electrically connected to the four charging rollers 14K, 14Y, 14M, and 14C as first loads through a node N2 as a second node. Each of the four charging rollers 14K, 14Y, 14M, and 14C has one end electrically connected to the node N2 and another end connected to ground as a first node.

In FIG. 3, the negative development circuit 300 includes a feedback control circuit 301. The feedback control circuit 301 has a first input I3 to which a command voltage (or negative output command voltage) V2 is applied from the print engine controller 153 (FIG. 2), a second input I4 to which a feedback voltage is applied from an output voltage conversion circuit 311 described later, and an output O2 connected to a first end E7 of a first primary winding W4 of a high-voltage transformer 307 as a second transformer through resistors 302 and 304. A second end E8 of the first primary winding W4 is connected to the base of an NPN transistor 305 through a diode 306 with its anode connected to the second end E8 and its cathode connected to the base. The junction of the resistors 302 and 304 is grounded through a capacitor 303.

The NPN transistor 305 has its collector connected to a first end E9 of a second primary winding W5 of the high-voltage transformer 307 and its emitter directly grounded. A second end E10 of the second primary winding W5 of the high-voltage transformer 307 is connected directly to the positive direct voltage source Vc (here, +24 V).

A first end E11 of a secondary winding W6 of the high-voltage transformer 307 is connected to an output 314 as a third output of the negative development circuit 300. The output 314 is connected to the cathode of the Zener diode 250 and the first end E5 of the secondary winding W3 of the high-voltage transformer 207 of the charge/development circuit 200. A second end 312 of the secondary winding W6 of the high-voltage transformer 307 is connected to the cathode of a diode 309. The anode of the diode 309 is connected to an output 312 as a fourth output of the negative development circuit 300, and is connected to the second input I4 of the feedback control circuit 301 through the output voltage conversion circuit 311.

A capacitor 310 is connected between the first end E11 of the secondary winding W6 and the anode of the diode 309. The output 312 is connected to the cathode of the Zener diode 250 through a resistor 260 as a first resistor. The output 312 is also connected to output adjustment circuits (or development voltage output adjustment circuits) 314K, 314Y, 314M, and 314C as output circuits and supply voltage output circuits (or toner supply voltage output circuits) 315K, 315Y, 315M, and 315C for black, yellow, magenta, and cyan. When the output adjustment circuits 314K, 314Y, 314M, and 314C need not be distinguished from each other, they may be referred to simply as the output adjustment circuits 314. When the supply voltage output circuits 315K, 315Y, 315M, and 315C need not be distinguished from each other, they may be referred to simply as the supply voltage output circuits 315.

Figure 4:
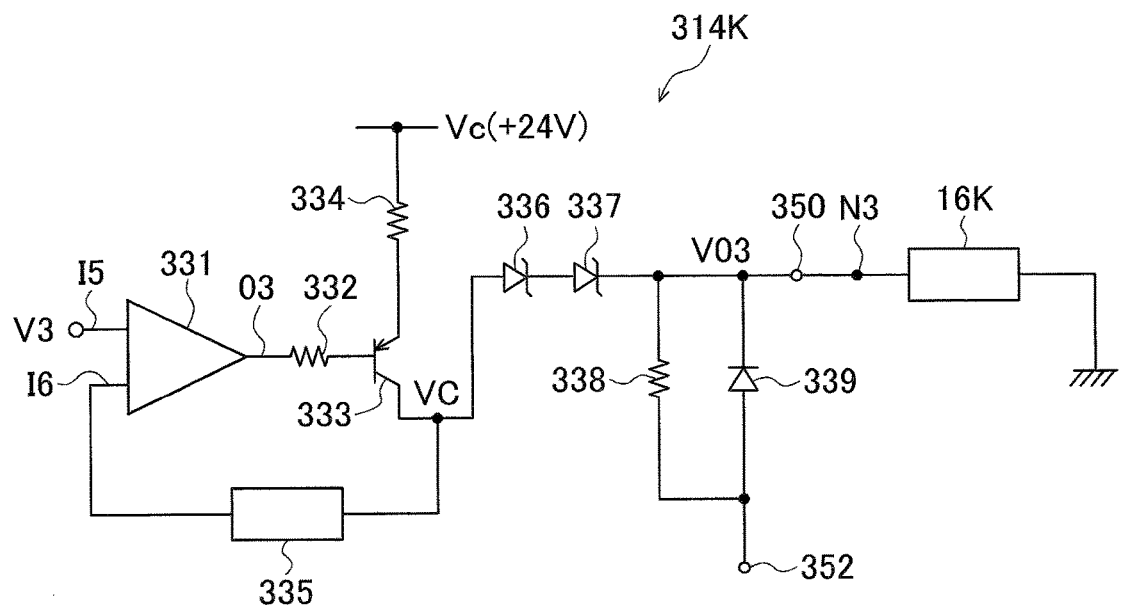
FIG. 4 is a circuit diagram of an output adjustment circuit in the charge/development/supply bias generator.

FIG. 4 is a circuit diagram of the output adjustment circuit 314K in the charge/development/supply bias generator 161.

In FIG. 4, the output adjustment circuit 314K includes a feedback control circuit 331. The feedback control circuit 331 has a first input I5 to which a command voltage (or development output command voltage) V3 is applied from the print engine controller 153, a second input I6 to which feedback voltage is applied from an output voltage conversion circuit 335 described later, and an output O3 connected to the base of a PNP transistor 333 through a resistor 332. The PNP transistor 333 has its emitter connected to the positive direct voltage source Vc (here +24 V) through a resistor 334 and its collector connected to the second input I6 of the feedback control circuit 331 through the output voltage conversion circuit 335.

The collector of the PNP transistor 333 is also connected to a series connection of Zener diodes 336 and 337 as a first Zener diode. The collector of the PNP transistor 333 is connected to the anode of the Zener diode 336. The cathode of the Zener diode 337 is connected to an output 350 as a fifth output of the output adjustment circuit 314K. The output 350 is connected town input 352 through a parallel connection of a resistor 338 as a second resistor and a diode 339 as a first diode. The cathode of the diode 339 is connected to the output 350. The output 350 is electrically connected through a node N3 as a third node to the developing roller 16K as a second load in the image forming unit 12K (FIG. 1). The developing roller 16K is connected between the node N3 and ground. The input 352 is connected to the output 312.

The configurations of the output adjustment circuits 314Y, 314M, and 314C are the same as that of the output adjustment circuit 314K.

Figure 5:
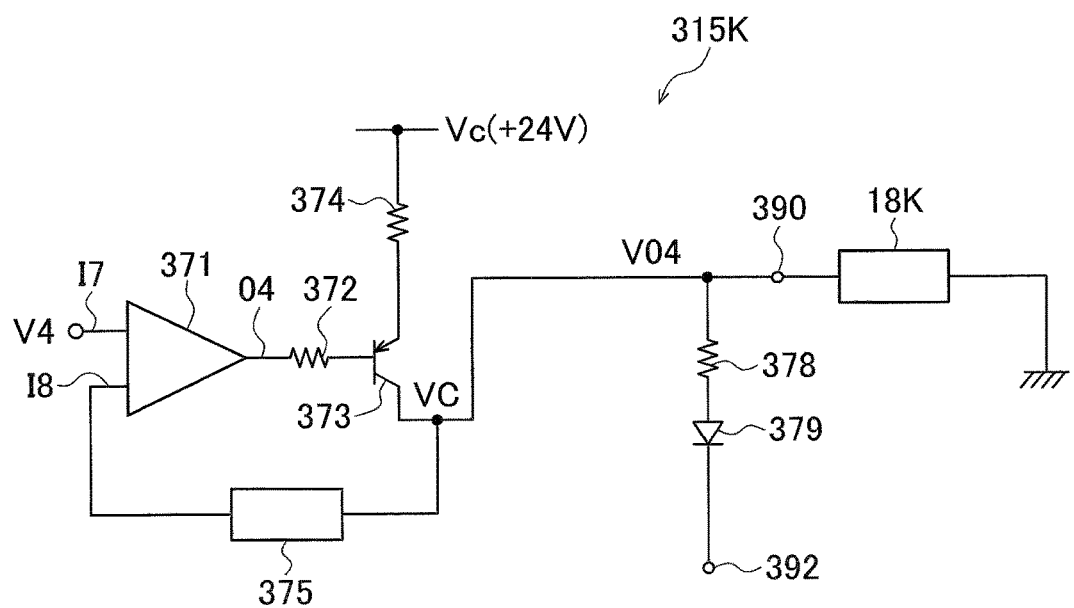
FIG. 5 is a circuit diagram of a supply voltage output circuit in the charge/development/supply bias generator.

FIG. 5 is a circuit diagram of the supply voltage output circuit 315K in the charge/development/supply bias generator 161.

In FIG. 5, the supply voltage output circuit 315K includes a feedback control circuit 371. The feedback control circuit 371 has a first input I7 to which a command voltage (or supply output command voltage) V4 is applied from the print engine controller 153, a second input I8 to which feedback voltage is applied from an output voltage conversion circuit 375 described later, and an output O4 connected to the base of a PNP transistor 373 through a resistor 372. The PNP transistor 373 has its emitter connected to the positive direct voltage source Vc (here, +24 V) through a resistor 374 and its collector connected to the second input I8 of the feedback control circuit 371 through the output voltage conversion circuit 375.

The collector of the PNP transistor 373 is also connected to an output 390 of the supply voltage output circuit 315K. The output 390 is connected to an input 392 through a series connection of a resistor 378 and a diode 379. The anode of the diode 379 is connected to the output 390 through the resistor 378. The output 390 is electrically connected to the tonner supplying roller 18K in the image forming unit 12K (FIG. 1).

The configurations of the supply voltage output circuits 315Y, 315M, and 315C are the same as that of the supply voltage output circuit 315K.

The operation of each of the above circuits will now be described.

In the charge/development circuit 200 illustrated in FIG. 3, the feedback control circuit 201 controls the collector current through the NPN transistor 205 to control an output voltage across the secondary winding W3 of the high-voltage transformer 207 that operates as a converter. The capacitors 208 and 210 and the diode 209 rectifies the output voltage across the secondary winding W3 to output the rectified voltage to the output 212 as an output voltage VO1. The output voltage conversion circuit 211 steps down and smooths the output voltage VO1 and feeds back the resultant voltage to the feedback control circuit 201. Thereby, the charge/development circuit 200 operates as a non-inverting negative feedback amplifier as a whole.

At this time, the feedback control circuit 201 operates so that the levels of the voltages applied to the two inputs I1 and I2 coincide with each other. An amplification factor of the charge/development circuit 200 depends on a step-down ratio of the output voltage conversion circuit 211. the input voltage V1 varies within the range of +3.3 V to 0 V. For example, the amplification factor is set so that when the input voltage V1 is 0 V, the charge/development circuit 200 outputs, as the output voltage VO1, a maximum output voltage of −1200 V due to an offset of the feedback control circuit 201. The charge/development circuit 200 is configured so that the absolute value of the output voltage VO1, which is negative, decreases in proportion as the input voltage V1 increases toward +3.3 V.

When the input voltage V1 exceeds a predetermined threshold, a converter circuit including the high-voltage transformer 207 and NPN transistor 205 is in a non-operating state. Hereinafter, the non-operating state may be referred to as the off output state. In the off output state, the output 212 is grounded through the Zener diodes 250, 251, and 252.

The print engine controller 153, which generates the input voltage V1, controls the charge/development circuit 200 so that the charge/development circuit 200 has the following three states: a first state in which VO1=−1200 V; a second state in which VO1=−300 V; and a third state in which the converter circuit is in the off output state. The output voltage VO1 is applied to the four charging rollers 14 for black, yellow, magenta, and cyan.

Each of the three Zener diodes 250, 251, and 252, which are connected between the first end E5 of the secondary winding W3 of the high-voltage transformer 207 and ground has a Zener voltage of 75 V. When the output voltage VO1 of the charge/development circuit 200 is −1200 V or −300 V, a reverse current flows through the Zener diodes 250, 251, and 252, so that the voltage at the cathode of the Zener diode 250 is +225 V.

The configuration of the negative development circuit 300 illustrated in FIG. 3 is basically the same as that of the charge/development circuit 200. Similarly to the charge/development circuit 200, the negative development circuit 300 is configured to operate as a non-inverting negative feedback amplifier as a whole. The feedback control circuit 301 operates so that the levels of the voltages applied to the two inputs I3 and I4 coincide with each other. An amplification factor of the negative development circuit 300 depends on a step-down ratio of the output voltage conversion circuit 311.

Here, the input voltage V2 varies within the range of +3.3 V to 0 V. For example, the amplification factor is set so that when the input voltage V2 is 0 V, the negative development circuit 300 outputs, as its output voltage VO2, maximum output voltage of −600 V due to an offset of the feedback control circuit 301. The output voltage VO2 is a voltage at the output 312. The negative development circuit 300 is configured so that the absolute value of the output voltage VO2, which is negative, decreases in proportion as the input voltage V2 increases toward +3.3 V. When the input voltage V2 exceeds a predetermined threshold, a converter circuit including the high-voltage transformer 307 and NPN transistor 305 is in a non-operating state, which may be referred to as the off output state.

The print engine controller 153, which generates the input voltage V2, controls the negative development circuit 300 so that the negative development circuit 300 has the following two states: a first state in which VO2=−600 V; and a second state in which the converter circuit is in the off output state. The output voltage VO2 is supplied to the four output adjustment circuits 314 and four supply voltage output circuits 315 for black, yellow, magenta, and cyan, as described above.

When the negative development circuit 300 operates and the output voltage VO2 is −600 V, the output voltage VO2 (−600 V) is directly applied to the inputs 352 of the four output adjustment circuits 314 and the inputs 392 of the four supply voltage output circuits 315.

When the negative development circuit 300 is in the non-operating state (i.e., off output state) and the output voltage VO1 of the charge/development circuit 200 is −1200 V or −300 V, the positive voltage (+225 V) at the cathode of the Zener diode 250 is applied to the inputs 352 of the four output adjustment circuits 314 and the inputs 392 of the four supply voltage output circuits 315 through the resistor 260.

When the charge/development circuit 200 and negative development circuit 300 are both in the non-operating state (i.e., off output state), the inputs 352 of the four output adjustment circuits 314 and the inputs 392 of the four supply voltage output circuits 315 are in open states.

Thus, in the output adjustment circuit 314K illustrated in FIG. 4, the input 352 has the following three states: first state in which the input 352 is applied with the negative voltage (−600 V); a second state in which the input 352 is applied with the positive voltage (+225 V) through the resistor 260; and a third state in which the input 352 is in the open state. The same applies to the input 392 of the supply voltage output circuit 315K.

While the input 352 is applied with one of the negative voltage (−600 V) and the positive voltage (+255 V), the feedback control circuit 331 controls the collector current of the PNP transistor 333 to control the collector voltage VC of the PNP transistor 333. The output voltage conversion circuit 335 steps down and smooths the collector voltage VC and feeds back the resultant voltage to the feedback control circuit 331. Thereby, a feedback circuit of the output adjustment circuit 314K is configured to operate as a non-inverting negative feedback amplifier.

The feedback control circuit 331 operates levels of the voltages applied to the two inputs 15 and 16 coincide with each other. An amplification factor of the feedback circuit depends on a step-down ratio of the output voltage conversion circuit 335.

Here, the input voltage V3 varies within the range of +3.3 V to 0 V. For example, the amplification factor is set so that while the input 352 is in the first state (i.e., the input 352 is applied with the negative voltage of −600 V), the output adjustment circuit 314K outputs, due to an offset of the feedback control circuit 331, as its output voltage VO3, a voltage of −260 V when the input voltage V3 is 0 V, and a voltage of 0 V when the input voltage V3 is 3.3 V. The output voltage VO3 is a voltage at the output 350.

At this time, the collector voltage VC of the PNP transistor 333 is controlled to a voltage that is higher by a forward voltage of the Zener diodes 336 and 337, which is caused by a forward current flowing through the Zener diodes 336 and 337, than the output voltage VO3. Current flows through the resistor 338 so that the voltage drop (600 V−260 V) between the input 352 and the output 350 is maintained.

Further, the output adjustment circuit 314K is configured so that while the input 352 is in the second state (i.e., the input 352 is applied with the positive voltage of +225 V through the resistor 260), the collector voltage VC is 0 V due to an offset of the feedback control circuit 331 when the input voltage V3 is 3.3 V. When the collector voltage VC is 0 V, current flowing through the diode 339 flows through the Zener diodes 336 and 337 in the reverse direction and a Zener voltage of 75 V occurs across each of the Zener diodes 336 and 337, so that the output voltage VO3 at the output 350 of the output adjustment circuit 314K is fixed at +150 V.

The print engine controller 153, which generates the input voltage V3, controls the output adjustment circuit 314K so that the output adjustment circuit 314K has the following three states: a first state in which VO3=−260 V; a second state in which VO3=0 V; and a third state in which VO3=+150 V.

However, when the charge/development circuit 200 and negative development circuit 300 are both in the off output state (i.e., when the input 352 is in the third state), the output 350 is in an open state.

The output voltage VO3 set as above is applied to the developing roller 16K for black.

The output adjustment circuits 314Y, 314M, and 314C produce their output voltages and apply them to the developing rollers 16Y, 16M, and 16C, respectively, in the same manner as the output adjustment circuit 314K.

The supply voltage output circuit 315K illustrated in FIG. 5 includes a feedback circuit having the same configuration as that of the output adjustment circuit 314K. While the input 392 is applied with the negative voltage (−600 V), the feedback control circuit 371 controls the collector current of the PNP transistor 373 to control the collector voltage VC of the PNP transistor 373. The output voltage conversion circuit 375 steps down and smooths the collector voltage VC and feeds back the resultant voltage to the feedback control circuit 371. Thereby, the feedback circuit of the supply voltage output circuit 315K is configured to operate as a non-inverting negative feedback amplifier.

The feedback control circuit 371 operates so that the levels of the voltages applied to the two inputs 17 and 18 coincide with each other. An amplification factor of the feedback circuit depends on a step-down ratio of the output voltage conversion circuit 375.

Here, the input voltage V4 varies within the range of +3.3 V to 0 V. For example, the amplification factor is set so that while the input 392 is applied with the negative voltage (−600 V), the supply voltage output circuit 315K outputs, due to an offset of the feedback control circuit 371, as its output voltage VO4, a voltage of −400 V when the input voltage V4 is 0 V. The output voltage VO4 is a voltage at the output 390.

At this time, the output voltage VO 4 (=VC) at the output 390 of the supply voltage output circuit 315K is fixed at −400 V, and current flows through the resistor 378 due to the voltage drop across the resistor 378.

The print engine controller 153, which generates the input voltage V4, controls the supply voltage output circuit 315K so that VO4=−400 V. The output voltage VO4 set as above is applied to the toner supplying roller 18K for black.

No positive voltage needs to be produced by the supply voltage output circuit 315K. Thus, the diode 379 is connected to the resistor 378 in series to prevent the positive voltage (+225 V) appearing at the cathode of the Zener diode 250 from being applied to the output 390.

The supply voltage output circuits 315Y, 315M, and 315C produce their output voltages and apply them to the toner supplying rollers 181, 18M, and 18C, respectively, in the same manner as the supply voltage output circuit 315K.

Figure 6:
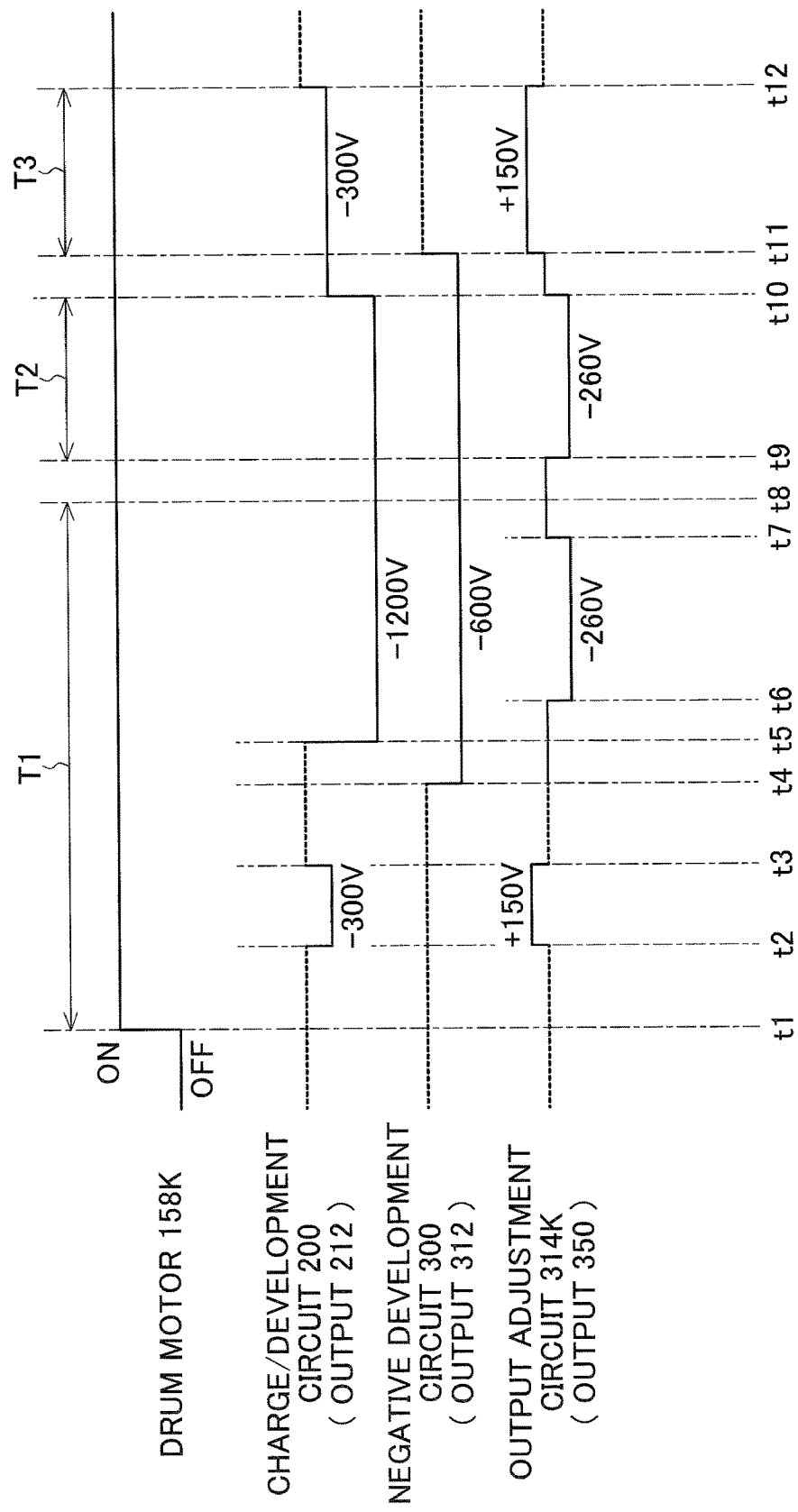
FIG. 6 is a sequence diagram illustrating operation, which is controlled by a print engine controller, of a drum motor, the charge/development circuit, the negative development circuit, and the output adjustment circuit in printing.

FIG. 6 is a sequence diagram illustrating operation of the drum motor 158K, charge/development circuit 200, negative development circuit 300, and output adjustment circuit 314K in printing. The operation is controlled by the print engine controller 153.

As illustrated in FIG. 6, in a process of printing an image on a recording sheet 30, at time t1, the drum motor 158K for driving rotating bodies, such as the photosensitive drum 13K, in the image forming unit 12K for black is turned on and starts to rotate. At this time, the charge/development circuit 200 and negative development circuit 300 are both in the off output state (i.e., their converter circuits are both in the non-operating state), and the outputs 212 and 312 are grounded through the Zener diodes 250, 251, and 252, so that the output 350 of the output adjustment circuit 314K is also grounded through the Zener diodes 250, 251, and 252. The dotted lines in FIG. 6 indicate the off output states.

At time t2, the output voltage VO1 of the charge/development circuit 200 is set to −300 V, and the positive voltage (+225 V) occurring at the cathode of the Zener diode 250 is applied to the output 350 of the output adjustment circuit 314K through the resistor 260 and diode 339. Simultaneously, the collector voltage VC of the transistor 333 of the output adjustment circuit 314K is set to 0 V. This generates a Zener voltage of +150 V across the Zener diodes 336 and 337, and the Zener voltage is applied to the developing roller 16K as the output voltage VO3.

Thereby, negatively charged toner on the developing roller 16K is attracted to the developing roller 16K and prevented from transferring to the charging roller 14K.

The output voltage VO1 (−300 V) of the charge/development circuit 200 is applied to the charging roller 14K, but the photosensitive drum 13K is not charged. The output voltage VO1 of the charge/development circuit 200 at this time is set so that the photosensitive drum 13K is not charged and the positive voltage (+225 V) occurs at the cathode of the Zener diode 250.

At time t3, the outputs 212, 312, and 350 are again grounded through the Zener diodes 250, 251, and 252.

At time t4, the output voltage VO2 of the negative development circuit 300 is set to −600 V. The output voltage VO2 (−600 V) is applied to the output 350 of the output adjustment circuit 314K through the resistor 338. The output adjustment circuit 314K receives the command voltage V3 from the print engine controller 153 and adjusts the collector voltage VC of the PNP transistor 333 to set the output voltage VO3 to 0 V.

At time t5, the output voltage VO1 of the charge/development circuit 200 is set to −1200 V. The output voltage VO1 (−1200 V) is applied to the charging roller 14K, so that charge of the photosensitive drum 13K starts.

In this embodiment, before time t5 (i.e., before the charge/development circuit 200 is activated), the negative development circuit 300 is activated to produce the voltage (−600 V) at time t4. This can prevent an undesired positive voltage from being applied to the output 350 of the output adjustment circuit 314K, thereby preventing an undesired event from occurring.

At time t6, the output adjustment circuit 314K receives the command voltage V3 from the print engine controller 153 and adjusts the collector voltage VC of the PNP transistor 333 to set the output voltage VO3 to about −260 V. The output voltage VO3 (−260 V) is applied to the developing roller 16K, and the development starts.

At time t7, at which the transfer process ends, the output adjustment circuit 314K receives the command voltage V3 from the print engine controller 153 and adjusts the collector voltage VC of the PNP transistor 333 to set the output voltage VO3 to 0 V, and the printing process ends at time t8.

Then, at time t9, a toner discarding process starts. The toner discarding process is intended to discard deteriorated toner occurring at a development portion, which is a portion where the developing roller 16K is in contact with toner, when continuous printing is performed with a small amount of toner. In the toner discarding process, while the output voltage VO1 (−1200 V) continues to be applied to the charging roller 14K, the output voltage VO3 is set to −260 V and applied to the developing roller 16K. This causes toner to transfer onto the photosensitive drum 13K. The toner transferred onto the photosensitive drum 13K is further transferred onto the transfer belt 26, scraped off by the belt cleaning blade 32 (FIG. 1), and stored in the belt cleaner container 33. On the other hand, residual toner remaining on the photosensitive drum 13K after the transfer is scraped off by the cleaning blade 27K.

At time t10, the output voltage VO1 of the charge/development circuit 200 is set to −300 V, the output voltage VO3 of the output adjustment circuit 314K is set to 0 V, and the toner discarding process ends.

Then, at time t11, a charge cleaning process starts. The charge cleaning process is a process for discarding toner adhering to the charging roller 14K. Toner may adhere to the charging roller 14K due to various causes. For example, in printing, residual toner remaining on the photosensitive drum 13K may adhere to the charging roller 14K without being removed by the cleaning blade 27K.

At time t11, the output voltage VO1, which is applied to the charging roller 14K, is set to −300 V. This facilitates transfer of toner from the charging roller 14K to the photosensitive drum 13K. Toner transferred to the photosensitive drum 13K further transfers onto the transfer belt 26, scraped off by the belt cleaning blade 32 (FIG. 1), and stored in the belt cleaner container 33. On the other hand, residual toner remaining on the photosensitive drum 13K after the transfer is scraped off by the cleaning blade 27K.

During the charge cleaning process, the output voltage VO3, which is applied to the developing roller 16K, is set to +150 V. This prevents toner on the developing roller 16K from transferring to the photosensitive drum 13K, thereby allowing the cleaning of the charging roller 14K to be performed smoothly or successfully.

At time t12, at which the charge cleaning process ends, the output 212 of the charge/development circuit 200 shifts to the off output state, so that the outputs 212, 312, and 350 are grounded through the Zener diodes 250, 251, and 252.

In FIG. 6, the printing process is performed during period TI from time t1 to t8, the toner discarding process is performed during period T2 from time t9 to t10, and the charge cleaning process is performed during period T3 from time t11 to t12.

Although the printing process, toner discarding process, and charge cleaning process for black have been described, the same processes are performed for yellow, magenta, and cyan at predetermined timings. In this example, each time printing is performed on a recording sheet 30, the series of processes (i.e., the printing process, toner discarding process, and charge cleaning process) is performed.

In this embodiment, the series connection of the Zener diodes 250 to 252 has been described as an example of an element for clamping a positive voltage (or constant positive voltage). However, other elements, such as varistors, may be used as the clamping element.

As described above, in the high-voltage power supply according to this embodiment, the output adjustment circuits 314 can apply the positive voltage and the negative voltage to the developing rollers 16 on the basis of the output voltages output by the charge/development circuit 200 and negative development circuit 300. Thus, it is possible to provide a high-voltage power supply having a simple circuit configuration and being capable of applying an appropriate voltage to the charging rollers 14 and developing rollers 16 in the printing process, toner discarding Process and charge cleaning process.

The present invention is not limited to the embodiment described above; it can be practiced in various other aspects without departing from the invention scope.

In the above embodiment, the present invention is applied to the image forming apparatus (specifically, electrophotographic color printer). However, the present invention may be applied to other devices. For example, the present invention is applicable to image processing apparatuses, such as monochrome printers, copiers, facsimile machines, or multi-function peripherals (MFPs).

What is claimed is:
1. A high-voltage power supply for a first load and a second load, the first load being connected between a first node and a second node, the second load being connected between the first node and a third node, the high-voltage power supply comprising:
- a first high-voltage output circuit having a first output connected to the second node, and a second output, the first high-voltage output circuit being capable of outputting a first voltage having a first polarity to the first load;
- a voltage clamping element connected between the second output and the first node, the voltage clamping element being configured to clamp a voltage at the second output to a second voltage having a second polarity opposite to the first polarity, the first high-voltage output circuit being connected between the voltage clamping element and the second node;
- a second high-voltage output circuit having a third output connected to the second output, and a fourth output, the second high-voltage output circuit being capable of outputting a third voltage having the first polarity; and
- an output circuit connected to the fourth output and having a fifth output connected to the third node, the output circuit being configured to produce a voltage having the first polarity and a voltage having the second polarity using the third voltage and a voltage derived from the second voltage and output the produced voltages to the second load.

2. The high-voltage power supply of claim 1, wherein the second output of the first high-voltage output circuit and the third output of the second high-voltage output circuit are connected to the fourth output of the second high-voltage output circuit through a first resistor, and
  wherein the fourth output of the second high-voltage output circuit is connected to the fifth output of the output circuit through a second resistor, and is connected to an anode of a first diode having a cathode connected to the fifth output of the output circuit.

3. The high-voltage power supply of claim 2, wherein the output circuit is configured to control a voltage at the fifth output through a first Zener diode having a cathode connected to the fifth output.

4. The high-voltage power supply of claim 1, wherein the first high-voltage output circuit includes a first transformer having a secondary winding having a first end connected to the second output of the first high-voltage output circuit and a second end connected to the first output of the first high-voltage output circuit.

5. The high-voltage power supply of claim 1, wherein the second high-voltage output circuit includes a second transformer having a secondary winding having a first end connected to the third output of the second high-voltage output circuit and a second end connected to the fourth output of the second high-voltage output circuit.

6. The high-voltage power supply of claim 1, wherein the voltage clamping element is a second Zener diode.

7. The high-voltage power supply of claim 1, wherein the first node is ground.

8. The high-voltage power supply of claim 1, wherein:
  the first polarity is negative and, the second polarity is positive;
  the voltage clamping element is configured to clamp the voltage at the second output to a positive voltage as the second voltage;
  the first high-voltage output circuit is configured to output a first negative voltage as the first voltage; and
  the second high-voltage output circuit is configured to output a second negative voltage as the third voltage.

9. An image forming apparatus, comprising:
  the high-voltage power supply of claim 1;
  a control circuit configured to control the high-voltage power supply;
  a charging roller; and
  a developing roller,
  wherein the charging roller is the first load, and the developing roller is the second load.

10. An image forming apparatus, comprising:
  the high-voltage power supply of claim 8;
  a control circuit configured to control the high-voltage power supply;
  an image carrier;
  a charging roller configured to charge the image carrier; and
  a developing roller configured to develop an electrostatic latent image formed on the charged image carrier with developer,
  wherein the charging roller is the first load and the developing roller is the second load.

11. The image forming apparatus of claim 10, wherein the control circuit is configured to:
  control the first high-voltage output circuit to set a level of the first negative voltage to a first level at which the image carrier is charged by the charging roller, and a second level at which the image carrier is not charged by the charging roller;
  control the second high-voltage output circuit to set a level of the second negative voltage to be higher than or equal to a level required for the development; and
  control the output circuit to switch an output voltage applied by the output circuit to the developing roller between a negative voltage having the level required for the development and a positive voltage.

12. The image forming apparatus of claim 11, wherein the control circuit is configured to, before setting the level of the first negative voltage to the first level, cause the second high-voltage output circuit to output the third voltage.

13. The image forming apparatus of claim 11, wherein the control circuit is configured to set the level of the first negative voltage to the second level and set the output voltage of the output circuit to a positive voltage, performing cleaning of developer adhering to the charging roller.

* * * * *